US009462540B2

(12) United States Patent
Giusto

(10) Patent No.: US 9,462,540 B2
(45) Date of Patent: Oct. 4, 2016

(54) USER EQUIPMENT FOR MOBILE TELECOMMUNICATIONS AND METHOD FOR ACCESSING A TELECOMMUNICATIONS NETWORK

(71) Applicant: SISVEL TECHNOLOGY S.R.L., None (TO) (IT)

(72) Inventor: Pietro Porzio Giusto, Rome (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 0 days.

(21) Appl. No.: 14/766,669

(22) PCT Filed: Feb. 28, 2014

(86) PCT No.: PCT/IB2014/059331
§ 371 (c)(1),
(2) Date: Aug. 7, 2015

(87) PCT Pub. No.: WO2014/136025
PCT Pub. Date: Sep. 12, 2014

(65) Prior Publication Data
US 2015/0373630 A1 Dec. 24, 2015

(30) Foreign Application Priority Data
Mar. 8, 2013 (IT) .............................. TO2013A0189

(51) Int. Cl.
*H04W 48/16* (2009.01)
*H04W 48/02* (2009.01)

(52) U.S. Cl.
CPC ............. *H04W 48/16* (2013.01); *H04W 48/02* (2013.01)

(58) Field of Classification Search
CPC .. H04L 63/101; H04L 63/083; H04W 48/16; H04W 28/0247; H04W 72/1252
USPC ........ 455/515, 522; 370/230, 332, 331, 252; 713/155
See application file for complete search history.

(56) References Cited

U.S. PATENT DOCUMENTS

| 2010/0197294 A1 | 8/2010 | Fox et al. |
| 2011/0199905 A1 | 8/2011 | Pinheiro et al. |
| 2013/0279330 A1* | 10/2013 | Feng .................... H04W 48/06 370/230 |

FOREIGN PATENT DOCUMENTS

| EP | 1 773 007 A1 | 4/2007 |
| EP | 2 205 026 A1 | 7/2010 |
| WO | 2012/013355 | 2/2012 |

OTHER PUBLICATIONS

International Search Report and Written Opinion dated May 13, 2014, issued in PCT Application No. PCT/IB2014/059331.

*Primary Examiner* — Phuoc H Doan
(74) *Attorney, Agent, or Firm* — Workman Nydegger

(57) ABSTRACT

A method and a user equipment (105) includes a communication device adapted to attempt to access a mobile telecommunications network (107) and to receive from the network (107) information about the presence of access restrictions to the network (107); the equipment (105) also includes an access management module (106) configured for determining, in the presence of access restrictions to the network (107), a wait time (Tbarring) that must elapse, at the least, between successive verifications of the possibility of accessing the network (107), wherein the wait time (Tbarring) is determined at least on the basis of the result of at least one previous attempt to access the network (107) by the user equipment (105).

15 Claims, 5 Drawing Sheets

USER EQUIPMENT FOR MOBILE TELECOMMUNICATIONS AND METHOD FOR ACCESSING A TELECOMMUNICATIONS NETWORK

BACKGROUND OF THE INVENTION

1. Field of the Invention

The present invention relates to a user equipment for mobile telecommunications and to a method for accessing a mobile telecommunications network.

2. Present State of the Art

According to the terminology currently adopted for the UMTS (Universal Mobile Telecommunication System) and LTE (Long Term Evolution) technologies, the term "user equipment" (or its acronym "UE") is used to indicate any device which can be directly used by a final user to communicate by connecting to the UMTS access network. It may be a mobile phone, a smartphone, a laptop with a broadband data adapter, or any other device connecting to the Radio Base Station, as set out in the ETSI 125/136-series and 3GPP 25/36-series specifications. In general, the user equipment corresponds to the mobile station (MS) of the GSM system. For simplicity, in the present description the term "user equipment" will refer to any device which can be directly used by a final user to communicate by connecting to the radio mobile access network, regardless of the standard adopted by the mobile telecommunications network itself (GSM, UMTS, CDMA2000, W-CDMA, etc.), in that the present invention is applicable without distinction to any of such devices.

When natural calamities (earthquakes, seaquakes, floods) or exceptional events (large gatherings, important sports events, New Year's celebrations, etc.) occur, the transmission resources of mobile telecommunications networks may become insufficient to meet the increased service demand. In such overload conditions, many service requests cannot be fulfilled because the required resources are insufficient (links between network elements, service server, routing units, etc.), and the users will react to this by reiterating their requests. The access request traffic will then increase out of all proportion, resulting in the risk that the signalling network collecting such traffic might become congested. In this case, the telecommunications system will enter a critical out-of-service condition.

The most effective way of preventing the signalling network from entering such a condition, or of bringing it out if it has unfortunately entered it, consists of applying access restrictions at the very origin, i.e. in the user equipments, so that the total requests collected in the signalling network will be smaller than the quantity that would otherwise cause it to become congested.

Restriction mechanisms of such a kind have been known for a long time. For example, the GSM 02.11 specification, version 3.5.0 of January 1991, of the GSM system (Global System for Mobile communications) already defined the possibility, which still exists, of inhibiting groups of users from issuing requests for accessing the mobile telecommunications network. For this purpose, mobile telecommunications network operators divide their customers, i.e., the SIM's (Subscriber Identity Modules) associated with their networks, into different "access classes" and, if needed, they can block any access requests from the SIM's belonging to one or more classes, in rotation, through signallings which are broadcast in each cell of the network, so as to allow the SIM's belonging to other classes to find the resources necessary to gain access to the services. Users having a normal priority level are distributed among ten access classes, while users having special priority levels (generally higher) are entered into five additional classes. Emergency calls are subject to a specific priority treatment.

The same technique is used in UMTS (Universal Mobile Telecommunications System), in accordance with the 3GPP TS 25.331 specification.

As for LTE (Long-Term Evolution), the access restriction mode was refined by substantially following patent EP 2205026 to NTT DoCoMo, Inc. (priority date: 24th October 2007), as partly anticipated by patent EP 1773007, also to NTT DoCoMo, Inc. (priority date: 7th October 2005). The 3GPP TS 36.331 V8.1.0 specification of March 2008, in fact, introduced a form of restriction dependent on two parameters:

a barring probability, according to which the user equipments draw for the possibility of attempting to access the network, as will be illustrated below;

an average wait time, indicating, as will be described below, the time that the user equipments must wait, after an unsuccessful barring draw, before attempting a new draw.

In March 2011, this restriction mode was further refined into the form set out in the 3GPP TS 36.331 V11.0.0 (2012-06) specification. The main rules will be synthetically described below without taking into account, for simplicity, the various particular cases and sub-cases tackled by the specification.

Considering that every user equipment has relevant system information (which is broadcast in every cell of the network), when the user equipment is requested to establish a connection to the network, said user equipment first verifies if in the cell it belongs to there is a barring that concerns it. If there is no barring, the equipment attempts to gain access by sending a first message to the network. If there is a barring, the user equipment performs the following phases:

a. it generates a "random probability value";

b. if the value is below the barring probability specified by the network, it issues the request for accessing the mobile telecommunications network;

c. otherwise, it emits no signal and generates a "random_delay_factor" evenly distributed between zero and one;

d. before allowing a new attempt to access the network, a wait time must elapse, which is calculated by using the following formula (1):

$$(0.7 + 0.6 \times \text{random\_delay\_factor}) \times \text{average wait time} \quad (1)$$

where the average wait time can be set by the network in the range of 4 seconds to 512 seconds (approx. 8.5 minutes), so that the wait time can range between a minimum value of 2.8 seconds and a maximum value of approx. 11 minutes.

This procedure allows to prevent the network from entering a congested state, or to bring it out if it has fallen into it, thus minimizing the resource utilization in the "uplink" transmission direction (i.e., from the user equipment to the radio base station), which in such circumstances is the critical one.

Restrictions can be set distinctly for the various services offered by the network (emergency calls, data services, signalling, GSM or UMTS circuit voice services, voice and video multimedia services specifically dealt with by document 3GPP TS 24.173, etc.), with the possibility of favouring those which are considered to be more useful as the case may be. However, the procedure of the 3GPP TS 25.331 specification has a few drawbacks.

When access restrictions are established, it is very likely that the traffic is already much more intense than that for which the network has been sized; therefore, it is not advisable that the restricted mode starts by giving the possibility of immediately generating an access request to a certain percentage of users (those who are lucky at the first draw), who might make concurrent requests.

After the initial transient, when it can be assumed that the expirations of the wait times are evenly distributed over time, to draw for the possibility of attempting an access after a wait time has elapsed means to reduce the average number of access attempts per time unit. From the network's viewpoint, the same result can be attained if, instead of a draw followed by a wait time having a given duration, the system simply imposes a wait time having the same duration as the preceding alternative divided by the probability of a successful draw. From the single users' viewpoint, on the other hand, the combination of draw and wait time may be more disadvantageous for some users than for others.

Let us assume, for example, that the barring probability imposed by the network is 85%. In such a case, the probability that a user equipment will have the possibility of attempting an access at the first draw will be 15%. This is not very different from the probability of 17% that another user equipment will make eleven consecutive unsuccessful draws ($0.85^{11} \approx 0.17$). Furthermore, at the end of a successful connection or after an unsuccessful access attempt, the user equipment that was granted access to the network can immediately draw for the possibility of requesting another access, just like any other user equipment to which the draw did not grant access for one or more consecutive times, and which therefore had to wait for one or more wait times to elapse (calculated with formula 1) prior to reattempting the draw.

Given the facts that after an unsuccessful draw it is necessary to wait for a wait time which may be as long as a few minutes, that the barring concerns the possibility of attempting an access, and that, if the possibility of making an attempt is obtained, it is not certain that the attempt will be successful (when exceptional events occur, it is very likely that the transmission resources stay close to saturation, if not congested), the probability is very high that some user equipments will not even be able to make a phone call for several tens of minutes.

On the other hand, it is important that all those finding themselves in emergency situations can establish at least one communication within a reasonable time, especially when the impossibility to communicate may cause stress, panic and anxiety, whether on individual or collective levels.

It must therefore be concluded that drawing for the possibility of immediately accessing the network is not appropriate in both the initial transient, i.e., when the access restrictions are applied, and in the steady state, because it makes for unfair access to the mobile telecommunications network.

In addition to the randomness of the draw, some users may also be disfavoured by propagation conditions because, when sending access requests on common channels with possible collisions between concurrent instances, the signals in better propagation conditions will most likely prevail.

Besides the techniques described in the 3GPP specifications, other solutions for limiting the risk of congestion of telecommunications networks are also known, such as those disclosed in patent US 2010/197294 and in patent application WO 2012/013355. The former claims a method for filtering access requests by the network, whereas application WO 2012/013355 describes a method for assigning a network access probability to single user equipments, considering that the network may comprise user equipments having a wide variety of characteristics and different connectivity requirements. Both of these methods assume the existence of a connection between the user equipment and the network, and hence they do not allow for balancing the network access probability when the user equipments can transmit no signals due to access restrictions which are already active.

SUMMARY OF THE INVENTION

The present invention aims at solving this and other problems by providing a user equipment, as well as a method implemented by said user equipment, for reducing or avoiding the congestion of a mobile telecommunications network.

The basic idea of the present invention is to increase the equity with which the user equipments for mobile communications can make an attempt to access the mobile telecommunications network, by dynamically differentiating the wait times that must elapse before the user equipments can attempt to access the network on the basis of the result of at least one previous access attempt, without affecting the efficacy ensured by the techniques known in the art in terms of network congestion reduction or prevention.

This idea also increases the probability that all user equipments can immediately establish at least one communication, while also promoting a reduction of the reiterations of access attempts and advantageously allowing the network to resume its normal conditions more quickly, resulting in shorter wait times for requests not yet met and better utilization of the system resources.

Further advantageous features of the present invention will be set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein.

DETAILED DESCRIPTION OF THE PREFERRED EMBODIMENTS

For simplicity, the invention will be described with reference to the LTE system, but those skilled in the art will understand that the invention is also applicable to other mobile communications systems, such as, for example, GSM and UMTS.

Figure 1:
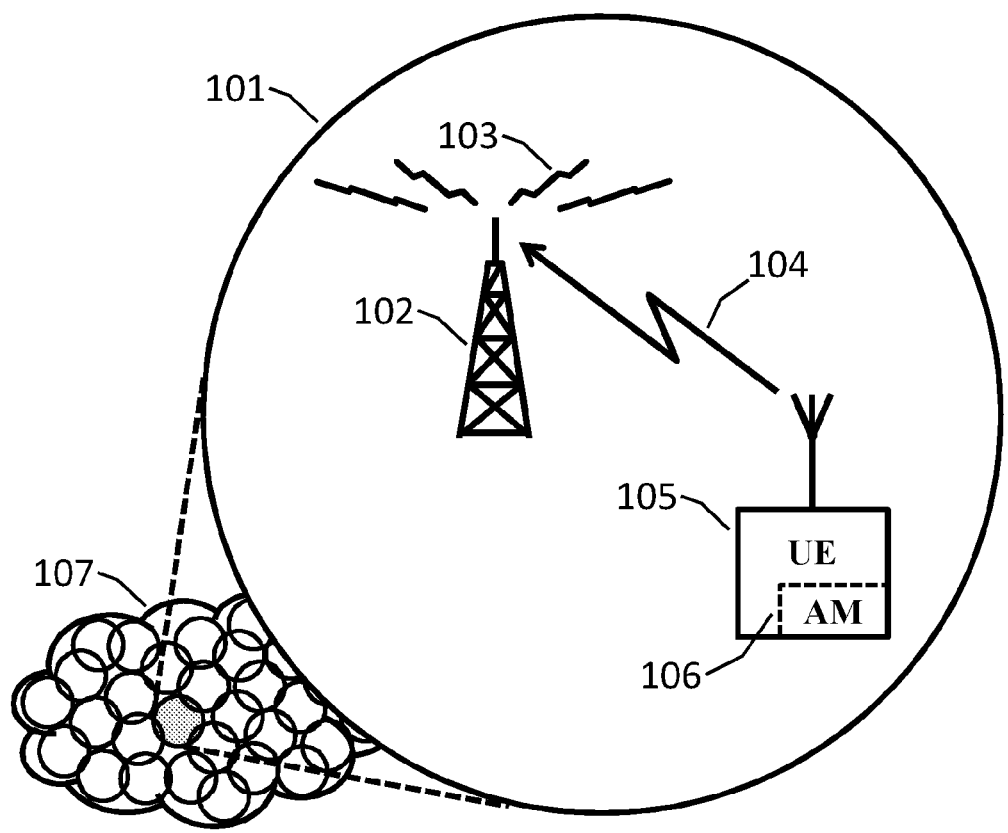
FIG. 1 shows an example of a scenario wherein the present invention is applied.

With reference to FIG. 1, there is shown a mobile telecommunications network 107, preferably a cellular one, comprising at least one radio cell 101, which in turn comprises a radio base station 102. The radio base station 102 can be logically connected to user equipments 105 located within said radio cell 101 in order to provide connectivity of various kinds (e.g., voice, data, SMS, MMS or the like).

The radio cell 101 may enter an overload condition for several reasons. A first cause for overload is an anomalous distribution of user equipments 105 within the network 107 (e.g., when a crowd of people concentrates in a stadium for a sports event or the like), i.e., when one or more cells 101 contain a greater number of user equipments 105 than that for which they have been sized. In fact, the resources of the cell 101, such as signalling or traffic channels, may become saturated, i.e. have no available band, and thus make it impossible for one or more user equipments 105 to establish communications and exchange data with the radio base station 102. A second cause for overload is high traffic generated by the user equipments 105 distributed within the network 107 towards particular nodes (not shown in the annexed drawings) of the same network 107 (e.g., when many user equipments 105 are used simultaneously for sending messages on holidays or for exceptional events, such as earthquakes, floods or the like); such nodes may, in fact, include elements providing a particular service to the user equipments 105, e.g., DNS (Domain Name Service), call routing, SMS (Short Message Service), data packet routing or other services.

In cases like these, as well as in other cases which are well known to the man skilled in the art, many service requests cannot be fulfilled because some resources are not available, resulting in the requests being reiterated by the users. This increases the cell's signalling traffic, so that many access requests will mutually interfere, thus further increasing the rate of failed access attempts and the number of reiterations made by the users.

Within the present description, "access attempt" refers to any connection service request sent to the telecommunications network by the user equipment UE 105. The expression "access attempt" is used herein in order to highlight the fact that requests will not always be successful, and that service access restrictions may be applied to such services, so that it cannot be certain a priori that the service will actually be available at any specific moment, even though it is included in the connection services that the telecommunications network can normally provide to the user equipment, which is assumed to be able to use such services.

In such conditions, the cell's signalling resources are likely to become congested, and it is therefore expedient to introduce access restrictions either in the cells 101 involved in the congestion or in the whole network 107; said restrictions must be notified to the user equipments 105, so that said user equipments 105 can limit their access requests to avoid transmitting signals potentially causing congestion themselves.

The notification of said restrictions can be broadcast in the cell 101 by the radio base station 102 via radio signals 103 carrying the so-called "system information". In fact, it is assumed that a procedure exists, as is the case in the LTE system taken herein as an example for describing the invention, through which the user equipments 105 set and keep up-to-date in a memory of their own the system information that concerns them. This procedure will not be described herein, but it is assumed that the system information which is set and updated by the user equipments includes any access restrictions set in the network 107.

In the first embodiment of the present invention, which will be described below, it is assumed that the access restriction information that is broadcast by the radio network is of the type required for the LTE system, in accordance with the 3GPP TS 36.331 V11.0.0 specification. In particular, it is assumed that the network indicates:

the type of access (emergency, signalling, data transmission, etc.) to which the restriction applies;

a reference time interval for determining wait times;

any other parameters affecting the probability of being allowed to make an attempt to access the network.

The access restriction mechanism of the present invention is based upon the determination of a wait time that a user equipment must allow to elapse, at the least, before verifying the possibility of making an attempt to access the network, whether after an unsuccessful access attempt or after the end of a successful connection. The expression "verifying the possibility of making an attempt to access the network" refers to the execution of all actions and verifications required by the network prior to the transmission of an access request. All of said verification actions may then be followed, depending on their result, by an attempt to access the network, through the emission of an appropriate signal by the user equipment. If the access attempt is successful and the network accepts the service request in question, a connection can be established between the user equipment and the network for the provision of the service.

The user equipment 105 comprises an access management module 106 that determines the wait time, and transceiver means adapted to try to access the mobile telecommunications network 107.

The following will illustrate how the present invention can improve the fairness with which the user equipments 105 can try to gain access to the network 107.

Figure 2:
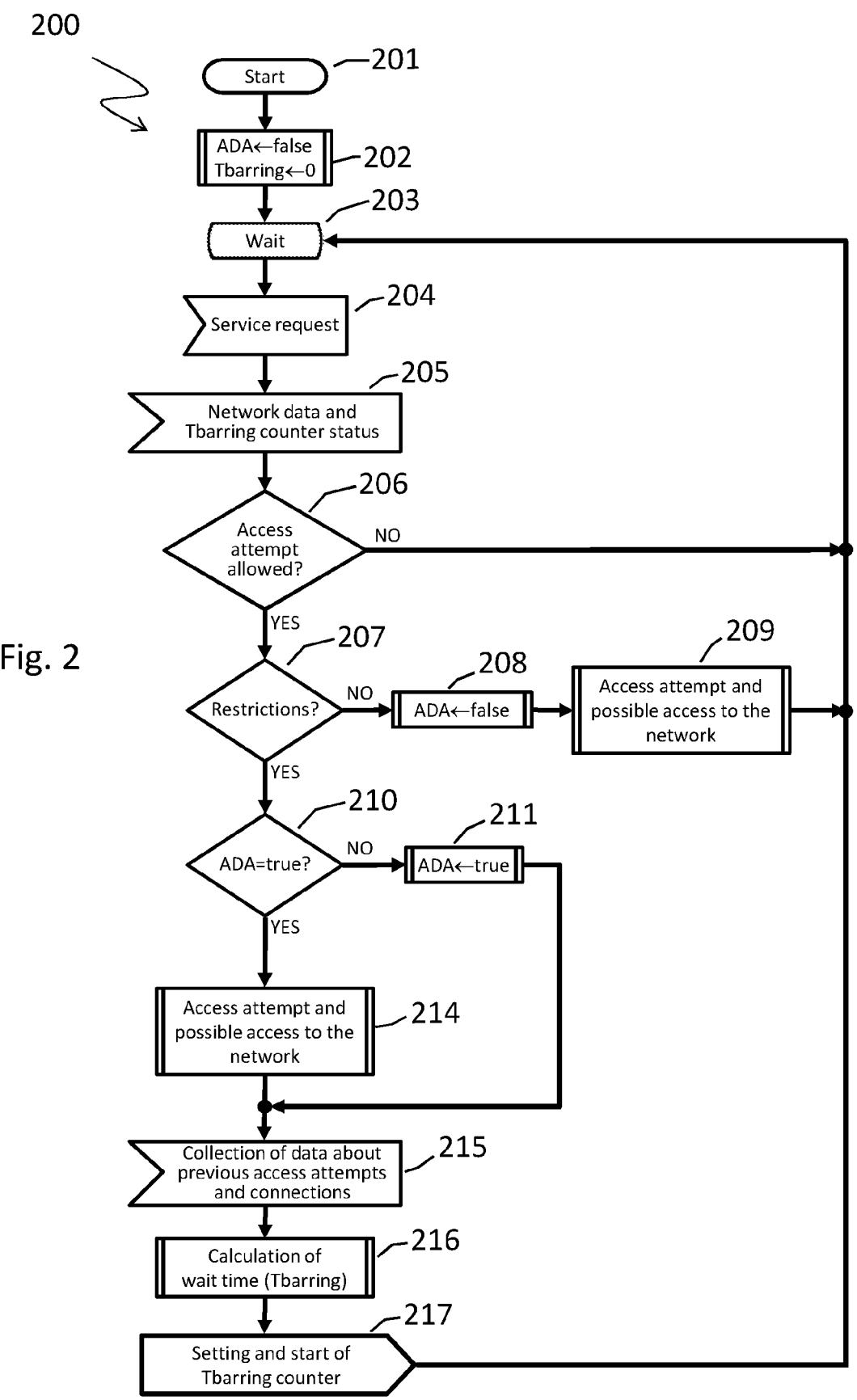
FIG. 2 is a flow chart representing the operation of the first embodiment of the present invention.

In order to make the invention more easily understood, the following will describe, also with reference to FIG. 2, the operation of the user equipment 105 and of the associated method according to a first embodiment of the invention 200.

The method comprises a start phase 201 followed by an initialization phase 202, during which a logic variable ADA (Access Delay Applied) is set to a "false" value and the value of the wait time Tbarring is set to zero. These initializations, just like the initializations of other parameters that will be discussed below, may take place, for example, during the procedures which are executed when the user equipment 105 is turned on.

The initialization phase 202 is followed by a wait phase 203, during which the equipment 105 waits for a service request from the user, e.g., issued by pressing a key of the user equipment 105, or from an application, issued through an appropriate message.

As it receives a service request, the user equipment 105 enters a service request management phase 204, during which the user equipment 105 starts suitable procedures for fulfilling said request. Following said management phase 204, the user equipment 105 enters an access data reading phase 205, during which it acquires or updates the data about the status of any network access restrictions and the status of a "Tbarring" wait time counter, the functions of which will be described later on.

By processing said data, it is determined whether the user equipment 105 is allowed or not to make an attempt to access the network (choice phase 206). This decision depends on the data being broadcast by the network in the cell where the user equipment 105 is located and on the status of the Tbarring counter. The data broadcast by the network will not be described any further because they do not concern any aspects that characterize the present invention. In particular, it is assumed that the procedures described in the present invention lie within the general context of wireless network access control, wherein access classes can be defined and access attempts are inhibited in particular conditions that will not be described herein.

The wait time Tbarring, which may have elapsed or not, will however be dwelt upon below. If the wait time Tbarring has not elapsed (i.e., the counter is still counting), no attempt to access the network is allowed and the process returns to the wait phase 203, awaiting the next service request.

If, on the contrary, the data received from the network 107 do not inhibit the user equipment 105 from making an access attempt and Tbarring has elapsed (the counter has stopped counting), a second choice phase 207 is carried out, wherein it is verified if the network is imposing any access restrictions.

If there are no access restrictions, the procedure goes on to a setting phase 208, wherein the value of a logic variable ADA is set to "false", and then to an access phase 209, wherein an attempt to access the network is made, which may or may not originate a connection for the provision of services. Finally, the process goes back to the wait phase 203.

If, on the contrary, in the second choice phase 207 it turns out that there are access restrictions, a third choice phase 210 is carried out, wherein the value of the logic variable ADA is checked. If ADA is equal to the "true" value, the process goes on to a restricted access phase 214, wherein an attempt to access the network is made, which may or may not originate a connection for the provision of services, and then to a data collection phase 215, wherein the data about previous access attempt(s) and/or network connection(s) 107 are collected.

If in the choice phase 210 the logic variable ADA is equal to the "false" value, ADA is set to a "true" value (phase 211) and the collection phase 215 is carried out without attempting to access the network.

Depending on the data collected in phase 215, the user equipment 105 calculates, during a calculation phase 216, the wait time Tbarring (see formula 2 below) and, during a counter start phase 217, starts the "Tbarring" wait time counter, the status of which indicates whether said wait time Tbarring has elapsed or not. The status of this counter can be verified in a further phase 206, if, after the procedure has returned to the wait phase 203, a new service request is issued (phase 204), with all that ensues therefrom.

With this first embodiment, in restricted access conditions all access attempts are preceded by a wait time.

Figure 3:
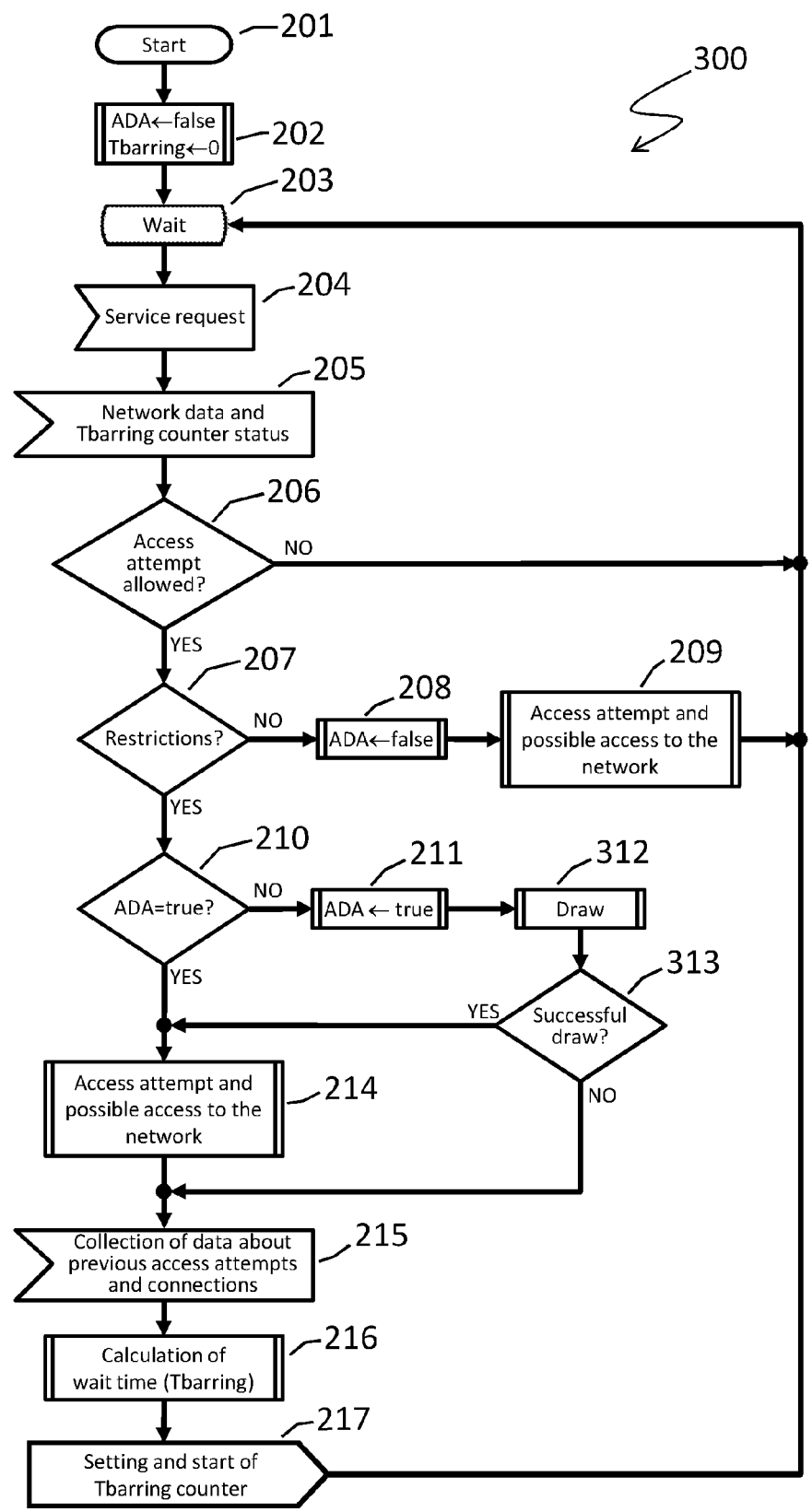
FIG. 3 is a flow chart representing the operation of a first variant of the first embodiment of the present invention.

A first variant 300 of the first embodiment of the invention includes a draw downstream of phase 211 of FIG. 2, represented in FIG. 3 by a drawing phase 312. The draw can be implemented, for example, by comparing a random or pseudorandom number, instantly generated by the user equipment, with a reference probability received from the network or preset or otherwise made available. As will be apparent to one skilled in the art, other types of decisions are also applicable, which allow a sub-set of user equipments, defined statistically or otherwise, to make an attempt to access the network.

After the drawing phase 312, the user equipment 105 enters a choice phase 313, wherein the result of the draw is evaluated. If the draw has been unsuccessful, then the user equipment 105 enters the data collection phase 215 without making any access attempt. If, on the contrary, the draw has been successful, an attempt to access to network is made (phase 214), followed by the data collection phase 215. In this manner, a certain percentage of user equipments 105, statistically dependent on the characteristics of the draw, can make an attempt to access the network without waiting for a wait time to elapse.

This first variant can be considered to be a generalization of the first embodiment of the invention; it should be noted that, if the variables that determine the decision 313 are set in such a way that the decision will systematically turn out to be negative (phase 211 is always followed by phase 215), the results of the application of this variant will always coincide with those which would be obtained by applying the first embodiment shown in FIG. 2.

Figure 4:
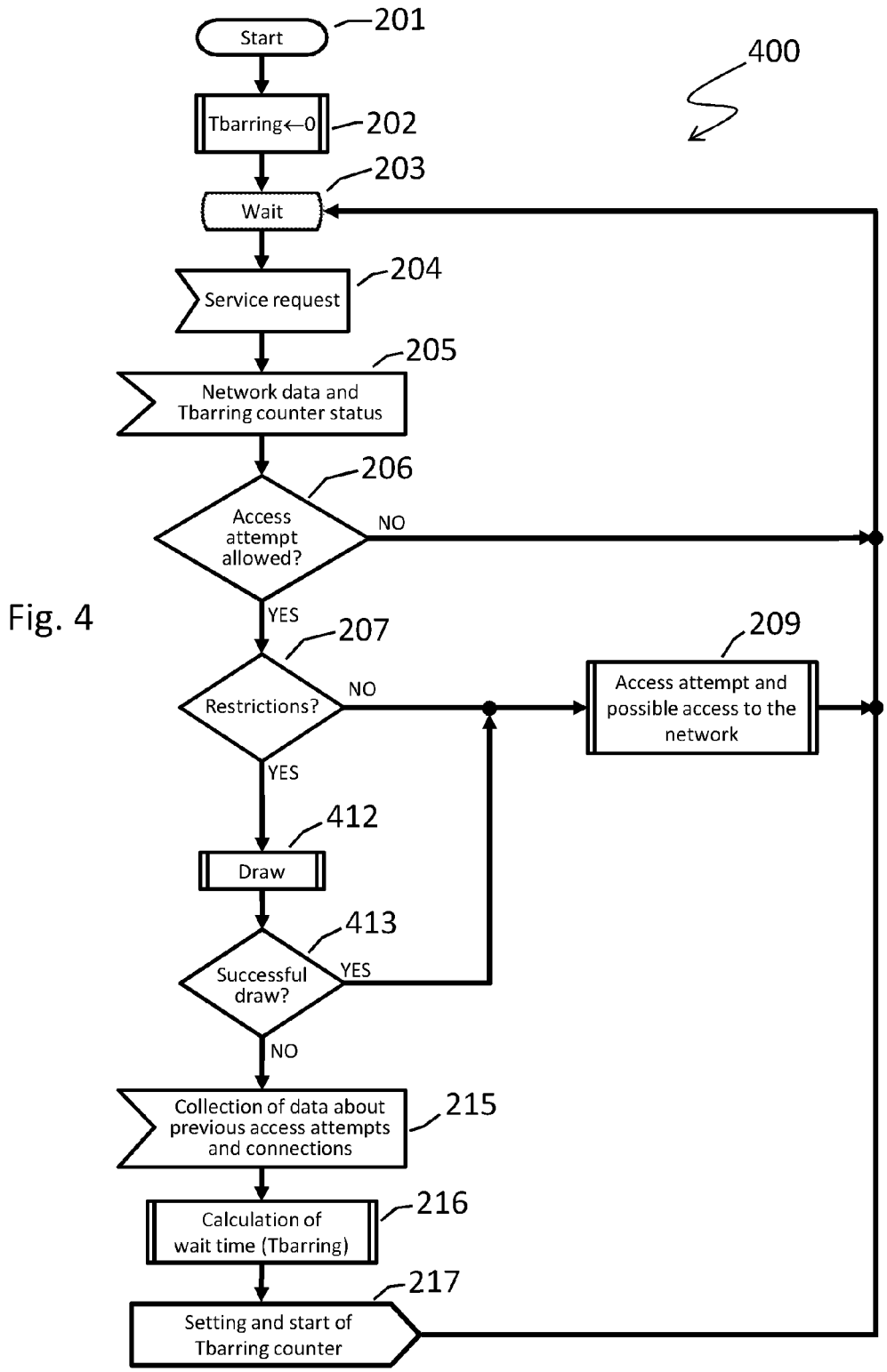
FIG. 4 is a flow chart representing the operation of a second variant of the first embodiment of the present invention.

A second variant 400 of the first embodiment consists of keeping the variable ADA constantly at the "false" logic value and switching, when the result of the draw in phase 313 is favourable, from phase 313 to phase 209 of FIG. 2, instead of phase 214. In this case, the variable ADA and the phases 202, 208, 210, 211 and 214 can be removed, and the positive result of the decision 207 can be followed by the draw 212, as shown in FIG. 4, where the drawing phase is labelled 412 and the resulting decision is labelled 413. Except for the Tbarring calculation formula, which will be discussed below, this provides the same algorithm operation as specified in the 3GPP TS 36.331 V11.0.0 document. This variant is simpler than the above-described first embodiment, but after an access attempt it no longer requires setting a wait time that must elapse before another attempt to access the network can be made. The wait time is only interposed after a failed access attempt.

Further variants will be described below. The following will describe one example of a formula used for the Tbarring calculation during the processing carried out in the calculation phases 216 of FIGS. 2, 3 and 4. The example concerns the following formula (2), which takes into account the failed access attempts and the characteristics of the connections established after successful access attempts:

$$Tbarring = \qquad (2)$$
$$Brt \times [1 - w1 \times (1 - 2 \times rand)] \times \times [1/(1 + w2 \times fails^g)] \times \times$$
$$\left\{ 1 + w3 \times \sum_i Brt / [Brt + w4 \times (t_c - t_{vi})] \right\} \times \times$$
$$\left\{ 1 + w5 \times \sum_i d_{vi} / [Brt + w4 \times (t_c - t_{vi})] \right\} \times \times$$
$$\left\{ 1 + w6 \times \sum_j Brt / [Brt + w4 \times (t_c - t_{sj})] \right\} \times \times$$
$$\left\{ 1 + w7 \times \sum_k v_{dk} / [Brt + w4 \times (t_c - t_{dk})] \right\}$$

where Tbarring is the wait time that the user equipment must allow to elapse before trying to access the network 107, starting from the instant at which Tbarring is set, whereas the symbol × indicates a multiplication. Those skilled in the art will understand that Tbarring may also be defined otherwise, without essentially changing the operation of the user equipment 105 and without departing from the method of the invention. In particular, the Tbarring wait time start instant may be set at the start of the attempt to access the network after which Tbarring is calculated, or at the end of said attempt, or at the end of the connection possibly established after said attempt, or at other instants. The meaning of the symbols of the second member of the formula (2) is explained in the following list:

Brt Reference time interval having a value greater than zero;

$d_{vi}$ duration, greater than or equal to zero, of the voice service connection of index i originated by the user equipment 105;

fails non-negative integer number of failed attempts among the total ones taken into account;

g exponent to which the number of failed attempts taken into account must be raised; g is a non-negative real number, preferably within the range [0, 1], i.e., 0≤g≤1;

rand random or pseudorandom number within the range [0, 1), generated by the user equipment 105, i.e., 0≤rand<1;

$t_c$ time instant at which Tbarring is set;

$t_{dk}$ time instant, earlier than $t_c$ ($t_{dk}<t_c$), at which the user ended the data connection of index k originated by the user equipment 105;

$t_{vi}$ time instant, earlier than $t_c$ ($t_{vi}<t_c$), at which the user ended the voice service connection of index i originated by the user equipment 105;

$t_{sj}$ time instant, earlier than $t_c$ ($t_{sj}<t_c$), at which the user sent the SMS of index j by means of the user equipment 105;

$v_{dk}$ volume of the data transmitted in uplink by the user equipment 105 during the connection of index k originated by the user equipment 105;

w1 parameter within the range [0;1), i.e., 0≤w1<1 that determines the degree of uncertainty of the wait time;

w2 parameter greater than or equal to zero (w2≥0) that determines the weight of the failed access attempts;

w3 parameter greater than or equal to zero (w3≥0) that determines the weight of the successful voice service connections originated by the user equipment 105;

w4 parameter greater than or equal to zero (w4≥0) that determines the weight of the time elapsed since the end of the event being considered;

w5 parameter greater than or equal to zero (w5≥0) that determines the weight of the duration of the voice service connections originated by the user equipment 105;

w6 parameter greater than or equal to zero (w6≥0) that determines the weight of the SMS's originated by the user equipment 105;

w7 parameter greater than or equal to zero (w7≥0) that determines the weight of the volume of data transmitted by the user equipment 105 during the connection of index k.

It is assumed that the above-listed parameters, the indices i, j and k, and Tbarring are appropriately initialized, for example, during the procedures which are carried out when the user equipment is turned on. This assumption is not integrally shown in FIGS. 2-5, since it will be obvious to those skilled in the art. It should be noted that all indexed times of formula (2) precede the time instant $t_c$ at which the wait time Tbarring is set, for any value of the indices i, j and k, thus ensuring that said formula will never give negative values.

The formula (2) determines the wait time by taking into account, in the first line, the reference time interval Brt transmitted by the network, multiplied by a random or pseudorandom factor (the contents between square brackets in the first line) evenly distributed between the extremes (1−w1) and (1+w1). This random factor, which depends on the random number "rand", generated by the user equipment 105, and on the parameter w1, advantageously serves to avoid coincidences of events determined by different user equipments, which, especially immediately after the establishment of the restrictions, may cause problematical signal overlaps. In particular, the parameter w1 determines the distribution over time of the access attempts around an average wait time value that depends on Brt.

The parameter w1, just like the parameters g, w2, w3, . . . , w7 and other parameters that may be added, as will be explained later on, are stored in the access management module 106 of the user equipment 105. By default, it is assumed that such parameters are preset into the user equipment 105 at the factory by its manufacturer. They may also, however, be totally or partly transmitted in real time through the network 107 or set offline by the network operator by means of a suitable equipment physically connected to the user equipment 105 or connected thereto via a wireless connection, e.g., by using an OTA (Over-The-Air) or NFC (Near Field Communication) technique or otherwise.

In the formula (2) it is assumed that the parameters w1, w2, . . . , w7, Brt, fails and g are static, i.e., they do not change over time, so as to not excessively increase the computational cost and the memory required for the calculations; in general, however, all parameters (or a part thereof) can be made variable over time in order to take into account the variations of the network's conditions and contingent needs, so as to be able to dynamically control the access to the network. In particular, one or more weights w4 may be differentiated by service type and may also be dependent on the values of the indices i, j and k of the summations present in the formula 2, in which case they will have different values as a function of the time instants at which the previous attempts took place.

The variation ranges of the indices "i", "j", "k", as well as of other similar indices which may possibly be added, are preset, transmitted or set by the network in a similar manner, so as to reasonably limit the processing load. Such indices may, for example, vary between 1 and I, 1 and J, 1 and K, respectively, where I, J and K (and so on) are integer numbers greater than zero that determine the quantity of attempts to access the network 107 made by the user equipment 105 for voice traffic, SMS traffic and data traffic, respectively, which are to be taken into account when calculating the wait time, in the presence or absence of access restrictions.

Therefore, it should be noted that, according to the formula (2), Tbarring generally takes different values, at a given instant, depending on the result of previous attempts to access the network made by the user equipment 105. The "result" of an access attempt may be either a successful access request or an unsuccessful access request, resulting in the requested communication service being provided or not (e.g., voice service connection, SMS transmission). If the access attempt is successful, the "result" generally also includes the characteristics of the service provided to the user equipment 105, such as the incoming or outgoing traffic volume, the duration of the voice communication, the size of an MMS sent or received, etc.

If, for simplicity, only the result of the last attempt to access the voice service is considered, then w6=w7=0, the indices j and k will be absent, and the index i of the two summations pertaining to the voice service will take only the value 1. Furthermore, assuming for simplicity that g=1 and w2=1, the formula (2) will be reduced to:

$$Tbarring = Brt \times [1 - w1 \times (1 - 2 \times rand)] \times [1/(1+fails)] \times$$
$$\times \{1 + w3 \times Brt/[Brt + w4 \times (t_c - t_{v1})]\} \times \{1 + w5 \times d_{v1}/[Brt + w4 \times (t_c - t_{v1})]\} \quad (2.1)$$

In addition to considering only the result of the previous access attempt, in a particularly simple embodiment of the formula (2) Tbarring is not even dependent on the time interval elapsed since that access attempt (w4=0). It is also assumed that Tbarring is calculated in a non-stochastic manner (w1=0) and that, for simplicity, w3=1. With these assumptions, Tbarring only depends on the values of the parameters fails, w5 and $d_{v1}$, so that $$Tbarring = Brt \times [1/(1+fails)] \times (1+w5 \times d_{v1}/Brt) \quad (2.2)$$

If the previous access attempt was successful, fails will have a null value, $d_{v1}$ will be greater than zero, and the formula (2.2) will be reduced to the following terms:

$$Tbarring = Brt + w5 \times d_{v1} \quad (2.3a)$$

that is, the wait time imposed on the user equipment will be longer than the reference one by a quantity proportional to the duration of the last conversation, according to the value of the parameter w5. If, for example, w5=½, the prolongation will be 50% of said duration.

On the contrary, if the previous access attempt was unsuccessful, fails=1, $d_{v1}$ will be null, and the formula (2.2) will be reduced to:

$$Tbarring = Brt/2 \quad (2.3b)$$

that is, the wait time will be equal to half the reference one.

In this simple case, it can be observed that, after a failed access attempt, the Tbarring calculation gives a value which is smaller than that which would be obtained if the same access attempt had been successful.

Therefore, after the failure of a certain access attempt, the formula (2) provides a value of the wait time Tbarring which is shorter than that which would be obtained if the same access attempt had been successful, and vice versa. It can be easily demonstrated that this can be applied to any kind of service involved in the access attempt and to any valid combination of the values of the elements used in the formula (2), including, for example, the number of attempts taken into consideration, whether or not the access is restricted during the attempts made, the time elapsed since the attempts taken into account, the parameters w1-w7, the value of rand, and so on.

Said parameters may be set at the factory, by the network operator, or via real-time transmissions of values, so that the behaviour of the user equipments 105 can be differentiated according to their characteristics (e.g., techniques in use), to the services they are specialized in, to the services they are mostly used for (also depending on the SIM in use), and to the network's characteristics. In this manner, bandwidth utilization can advantageously be avoided when the network 107 or the cell 101 is about to enter a congested state. For example, if the user equipment 105 can only originate SMS traffic and data traffic (UMTS/HSPA broadband access modem for PC's), the Tbarring calculation formula (2) will only include the components relating to the SMS and data traffic, and hence the weights for voice traffic w3 and w5 will be both null.

Furthermore, considering that the modes of reception/transmission and of transmission resource occupation may be very different among the various types of services to which the user equipment 105 can access, the wait time Tbarring is differentiated also on the basis of the type of service to which the user equipment 105 intends to access.

Finally, Tbarring may be differentiated according to priorities assigned to the users' SIM's and/or to the user equipment 105 and/or to the counterpart of the connection to be established (e.g., calls to emergency numbers have priority over calls to other numbers).

The second line of the formula (2) contains a factor that reduces the wait time as the number of failed access attempts grows, which are assumed to be counted by the user equipment. This factor decreases as the parameter w2 and the number of fails (fails) taken into account increase. In addition, the number of failed attempts is raised to a power with exponent "g" so as to be able to differentiate, in combination with the parameter w2, the weight of the first fails from the weight of repeated fails. The failed attempts to be considered may be, for example, all those made starting from a given instant, or all those that were made prior to the instant at which Tbarring is calculated, and their maximum number may either be limited or not. In addition to these examples, the man skilled in the art may also define other rules for appropriately taking into account the connection attempts. The parameter g may theoretically have any value, but in practice it is thought that it will have values in the range [0, +1], because for negative values of g Tbarring will decrease as the number of failed access attempts increases, whereas for values greater than 1 Tbarring will grow more than proportionally thereto.

The third line contains the factor that determines the wait time increase dependent on the voice service connections originated by the user equipment 105. The weight of each one of these connections depends on the common parameter w3 and on the time elapsed since the end thereof ($t_c-t_{vi}$), referred to the reference interval Brt, according to the parameter w4. The longer the time elapsed since the end of a connection, the less the associated factor will weigh. A connection just ended will increase the wait time by a factor (1+w3), whereas a connection ended since a time equal to Brt/w4 will increase it by a factor (1+w3/2). The number of connections taken into account is determined by the range of the index "i". In particular, the index i, just like other indices concerning other components, can be set to take into account only the events occurred after the establishment of the access restrictions, or also previous events, or the events occurred after a given reference instant, which may be, for example, the instant at which an exceptional event has occurred, regardless of the instant at which the necessary access restrictions have then been established.

In a typical case, for example, all indices related to a type of service to which a network access restriction is applied are set to zero as soon as the user equipment 105 is informed by the network 107 about a partial restriction applied to a given type of service (voice, SMS or data traffic) or about a total restriction (applied to all services). At this point, the user equipment sets the Tbarring calculation by taking into account only the (failed or successful) attempts made starting from the instant when it came to know about the access restriction. In other words, the "memory" of the equipment extends up to the start of the access restrictions.

In another example of embodiment of the invention, the user equipment 105 may take into account and store the parameters relating to the access attempts (e.g. fails, $d_{vi}$, $v_{dk}$ and the associated characteristic instants $t_{dk}$, $t_{vi}$ and $t_{sj}$) for a predetermined number of consecutive access attempts, for one or more service types, regardless of the presence of access restrictions to the network 107, and may continue to do so even after the restrictions have been established. In this case, the user equipment 105 also takes into account the traffic generated by the equipment in the period immediately preceding the network's restricted status; in fact, in this case Tbarring is set by also considering what happened before the start of the restriction, so that particularly active users, who most contributed to overloading the network, will be more penalized than others, at least at the beginning of the restriction stage. In this second case, it can be said that the equipment's memory extends beyond the start of the access restriction.

The user equipments 105 normally keep track of the outgoing and incoming calls, and are therefore provided with all the elements which are necessary for calculating the value of the third line of the formula (2).

The fourth line contains the factor that determines the wait time increase based on the duration of the voice service connections originated by the user equipment 105. In this case, the weight of each duration is given by the product of the common factor w5 by the duration $d_{vi}$ of the connection being considered, referred to the same divisor as the preceding line, which takes into account the time elapsed since the end of the connection. A connection just ended, which has lasted a time equal to Brt, will increase the wait time by a factor (1+w5).

The fifth line of the formula (2) contains the factor that determines the wait time increase dependent on the SMS's sent by the user equipment 105. The expression is similar to that of the third line, except that the weight w3 is replaced by the weight w6; for brevity's sake, it will not therefore be commented upon any further.

Likewise, no comment will be made upon the sixth line of the formula (2), which contains the factor that determines the wait time increase based on the volume of data transmitted in uplink by the user equipment 105 during connections originated by it, for it is similar to the expression of the fourth line.

At the end of the sixth line, dots indicate that, for brevity, other expressions of factors similar to those already described are not shown. Those skilled in the art will be able, in fact, to add further factors with the associated expressions and parameters. For example, factors may be added which take into account the connections established upon command from the network and "terminated" at the user equipment (incoming calls, video calls or the like), the expressions of which are similar to those of lines three, four and six, which concern connections established upon command from the user equipment. Expressions may also be added in regard to incoming SMS's and downloaded data volumes, outgoing and incoming MMS's, multimedia services, services requiring communications with/among machines (e.g., the so-called Machine-to-Machine communications), which may involve washing machines, refrigerators, video surveillance systems, gas/water/energy meters or the like. In general, communications with/between machines may have very different characteristics and requirements from those of other types of communications; therefore, user equipments 105 designed for this purpose can be characterized by specific formulae and parameters in order to beneficially differentiate the Tbarring calculation.

The above-mentioned list of services should nevertheless be considered to be merely exemplary and not at all limiting or exhaustive.

Those skilled in the art will also understand that there are other types of mathematical expressions that can be used in order to determine reductions or increases of the wait time depending on the above-mentioned elements. For example, instead of using a set of factors greater or smaller than one, it is possible to create a formula with a set of positive or negative addends, or a formula consisting partly of factors and partly of addends, or formulae including logic operators, etc. What characterizes the invention is, in fact, the idea of shortening the wait times, i.e., increasing the probability of being able to access the network, for those user equipments 105 that have not been able to use the services to the detriment of those which have already used them.

Of course, the example described so far may be subject to many variations.

The method of the present invention as described above, comprising at least one phase in which the wait time is calculated with the formula (2), comprises at least one of the procedures generally represented in FIG. 2 and in the variants of FIGS. 3 and 4. It is preferably applied by means of a computer-based procedure written in any programming language and preferably executed by the access management module 106, or it may be applied directly by the module 106 by means of an electronic circuitry possibly comprising CPLD (Complex Programmable Logic Device), FPGA (Field Programmable Gate Array) or other programmable hardware.

Figure 5:
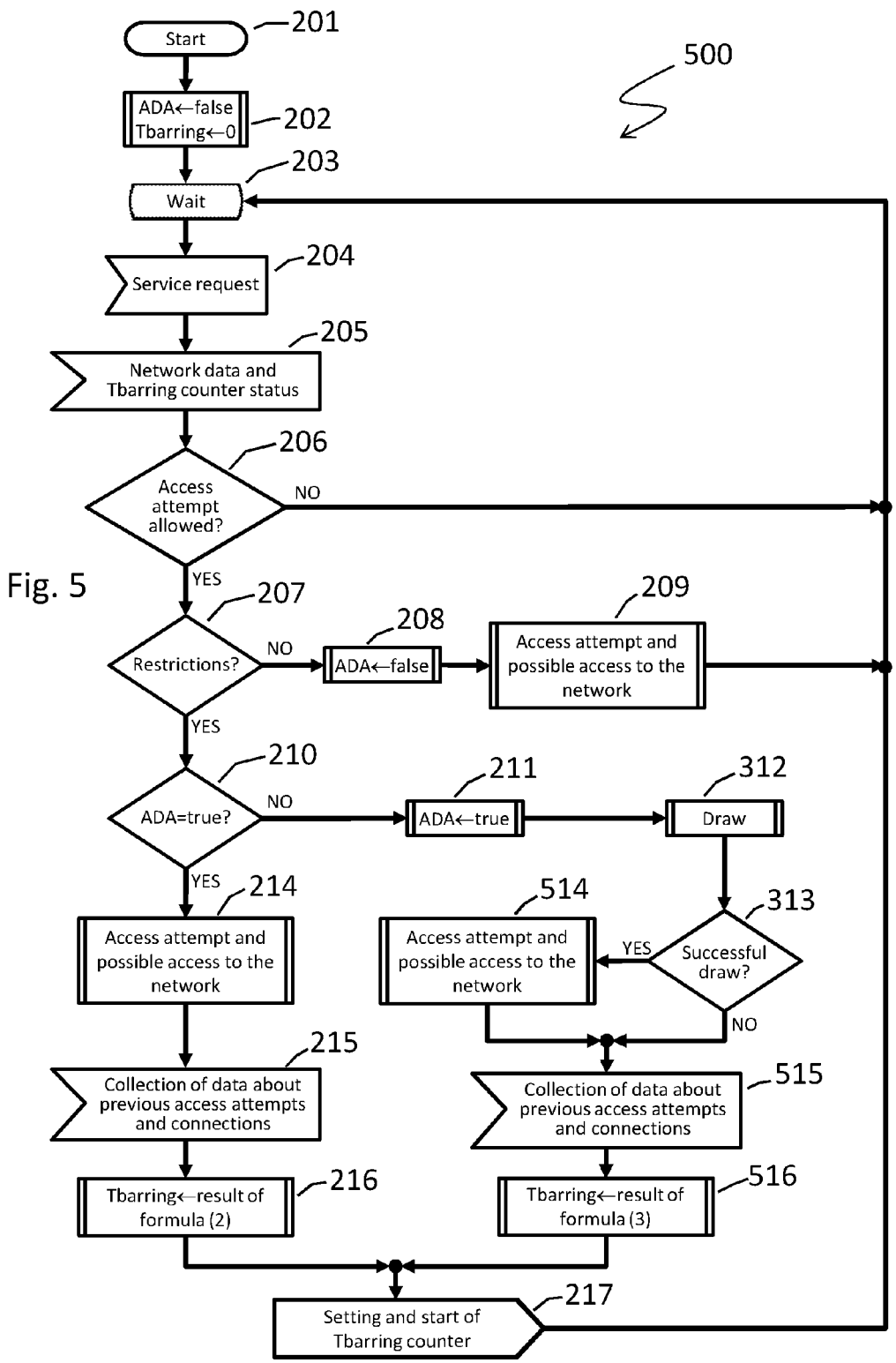
FIG. 5 is a flow chart representing the operation of the second embodiment of the present invention.

A second embodiment of the invention 500 is shown in FIG. 5. In this embodiment, the first wait time calculated after the establishment of the network access restrictions is determined by means of a different formula than the one that will be used afterwards.

Most of the procedure shown in FIG. 5 coincides with that of FIG. 3, as can be evicted from the similarity of the labels assigned to many phases and of the links that connect them. The most important difference between the two procedures lies in the calculation of the wait time Tbarring: in the case of the procedure of FIG. 2, Tbarring is still calculated with the formula (2) (calculation phase 216), whereas in the case of the procedure of FIG. 5 it is only calculated with the formula 2 if the variable ADA has the "true" logic value, i.e., if it is not the first Tbarring calculation being made after the establishment of the conditions of restricted network access. If, on the contrary, this is the first Tbarring calculation, it will be made by using the formula (3), which will be illustrated below. This differentiation is determined by the branching of phase 210 of FIG. 5, which in one case leads to the calculation phase 216 (Tbarring=result of formula (2)) and in the other case leads to a second calculation phase 516 (Tbarring=result of formula (3)), wherein the latter is preceded by a second data collection phase 515 (equivalent to the data collection phase 215), which may be preceded by a network access phase 514 (equivalent to phase 214).

By setting the variables that determine the choice phase 313 in such a way that the decision will systematically turn out to be negative, i.e. by removing the phases 312, 313 and 514, one obtains a scheme which is equivalent to that of FIG. 2, wherein, in conditions of restricted access, an attempt to access the network cannot be made without waiting for a time Tbarring to elapse, with the difference that the first Tbarring calculation occurring after the establishment of the restrictions is determined with the formula (3) as opposed to the formula (2).

For brevity, no further variants of this second embodiment will be described herein, for those skilled in the art will be able to conceive them without difficulty.

Said second embodiment represents the particular case wherein the wait time calculation is differentiated in dependence on the instant at which the conditions of restricted network access are established. One skilled in the art will also be able to determine one or more wait time differentiations in dependence on the difference between the time at which said wait time is applied and a given reference instant.

In regard to the second embodiment of the present invention, represented by the procedure of FIG. 5, one example of a formula for the calculation of the first wait time, which for simplicity refers to the voice service only, is the formula (3) given by the following expressions:

$$IF(t_c - t_v) > \Delta t_{vm}$$

$$Tbarring = Brt \times [1 - w1 \times (1 - 2 \times rand)]$$

$$IF(t_c - t_v) \leq \Delta t_{vm}$$

$$Tbarring = Brt \times [1 - w1 \times (1 - 2 \times rand)] + w8 \times Brt \quad (3)$$

where the symbols have the following meaning:

Brt reference time interval having a value greater than zero (Brt>0);

rand random or pseudorandom number within the range [0, 1), generated by the user equipment 105, i.e., $0 \leq rand < 1$;

$t_c$ time instant at which Tbarring is set;

$t_v$ time instant not later than $t_c$ ($t_v \leq t_c$) at which the user has ended the last voice service connection originated by the user equipment 105; if in the memory of said user equipment 105 there are no data relating to voice service connections, it is assumed that $t_v = -\infty$;

$\Delta t_{vm}$ time interval, preceding the setting of Tbarring, within which the end of the last voice service connection originated by the user equipment 105 implies a prolongation of the wait time;

w1 parameter within the range [0, 1), i.e., $0 \leq w1 < 1$, which, determines the degree of uncertainty of the wait time;

w8 Parameter greater than zero that regulates the value of the prolongation of the wait time caused by the last successful voice service connection originated by the user equipment 105.

The formula (3) discerns whether or not a time longer than $\Delta t_{vm}$ has elapsed since the instant at which the last voice service connection originated by the user equipment 105 was ended.

$\Delta t_{vm}$ is a system parameter set by the network 107 or by the manufacturer of the user equipment 105, the value of which increases with the penalty to be imposed on the user equipments 105 that were able to obtain a voice service connection.

If a longer time has elapsed, the formula (3) will take the same expression as the first line of formula (2), but the value of the parameter w1 may be different, and in particular may be greater in order to widely scatter over time the expirations of the first wait times being set.

If, on the contrary, a time longer than $\Delta t_{vm}$ has not elapsed, then the addend w8×Brt is added to the wait time of the previous case, on the assumption that the user has already been able to communicate something about the event that determined the establishment of the access restrictions.

It must be pointed out that this particular example of embodiment of the invention only takes into account previous attempts to access the network made in order to obtain a voice communication service, i.e., to make a voice conversation. Of course, the wait time Tbarring may conceivably also depend on the result of access attempts made by the same equipment for services other than voice, e.g., video calls, SMS, data transmission, etc. This applies to both the first and the second embodiments of the invention. Referring back to the second embodiment of the invention, although for simplicity the formula (3) only refers to the voice service, the man skilled in the art will understand that it is likewise possible to make a wait time calculation applicable to access requests for other services (e.g., SMS, data traffic) or even for a combination of multiple services, as is the case, for example, in the formula (2).

In general, wait times can be determined with two or more different formulae, for one or more types of traffic available to the user equipment, by circumscribing the use of each formula within a given time interval (e.g. an initial 20 second interval after the establishment of the restrictions, or a final 20 second interval before the removal of the restrictions), or for a predetermined number of wait time determinations identified, for example, by an order number attributed starting from the establishment of the restrictions (e.g., the first three wait time computations after the establishment of the restrictions).

Each one of the service-specific wait times may or may not in turn take into account only access attempts made by the user equipment 105 for a service of the same type as the one being the object of the current attempt. For example, in the calculation of the wait time to be applied to voice service connections one could take into account at least one previous access attempt for voice service connections and at least one previous access attempt for data service connections. As an alternative, the invention may be implemented by using a single formula for the calculation of the wait time to be applied to all attempts to access any type of service, depending on design choices, or to attempts to access only one specific type of service or some services or all services that can be requested to the network by the user equipment 105; this latter case is the one assumed in the formula (2).

The formula (3), presented herein as one possible formula for determining the initial wait time, should only be considered as an example used herein for the purpose of illustrating the principle. Those skilled in the art will be able, in fact, to conceive many other calculation formulae suitable for different operating conditions. In particular, the differentiation options described with reference to the formula (2) also apply to the formula (3).

Also the method of FIG. 5 is preferably implemented through a computer-based procedure written in any programming language and preferably executed by the access management module 106 or directly implemented by the module 106 by means of an electronic circuitry and/or CPLD or FPGA or other programmable hardware. This method comprises at least one phase wherein the wait time is calculated according to the formula (2) or the formula (3) or another formula.

In one example of embodiment, the formula (3) is used for calculating the first wait time to be applied after the establishment of the access restrictions, whereas the formula (2) is subsequently used for calculating said wait time until the restrictions are removed. The application of either formula depends on the same logic variable called ADA (Access Delay Applied), already employed for distinguishing the first Tbarring calculation, carried out after the restricted conditions have been established, from the following ones.

The present invention is particularly advantageous over the prior art when a calamity makes communications critical, and those in the area involved have urgent necessity to signal that help is needed or to reassure someone about their own health. In such circumstances, the impossibility to communicate at once is detrimental for rescue organization and generates anxiety, thus further worsening the effects of the distressing event.

By appropriately sizing the parameters based on which wait times are determined, the present invention offers the advantages mentioned herein with equal or increased effectiveness in terms of network decongestion, especially in the case of the above-described second embodiment. The latter, in fact, advantageously allows to differentiate the wait time determinations at the initial stages of restriction establishment, without the necessity of modifying the values of the parameters broadcast by the network, the updating of which would require costly operations.

With the present invention, the values of many parameters which are useful for calculating the wait time Tbarring can be set, whether at the factory or offline by the network operator. Without increasing the signalling and traffic load in critical network conditions, the behaviours of different user equipments can be differentiated depending, for example, on their reception/transmission technologies (GSM, GPRS, EDGE, UMTS, HSPA, LTE or the like), on the services for which the user equipments have been prevalently designed (voice, data, multimedia services, messaging services, video surveillance, machine-to-machine communications, etc.), on the services for which they are prevalently used, and on the users of the equipments, i.e., the SIM installed in the user equipment 105.

The above-described principles of the present invention are applicable to many variants and embodiments.

In summary, a first line of variants concerns the formulae for determining the wait times, which, in order to take into account the failed access attempts, the successful access attempts, the different types of user equipments 105, etc., may comprise factors, addends, exponential functions, logarithmic functions, variable elements subject to upper or lower limits, or the like. A second line of variants concerns the combination of different determination formulae at different stages of application of the access restrictions. Typically, one can differentiate the start phase from the steady-state phase, as in the above-described example, possibly extending the start phase beyond the first wait time determination and articulating it into sub-phases. In addition, it may be appropriate to differentiate also a phase of gradual restriction removal, so as to avoid that a sudden removal will trigger vicious circles that might bring the network back into a congested state. A third line of variants concerns the adaptation of the user equipment to particular characteristics of the user, possibly also considering confidential personal data which, although not taken into account in normal conditions, should however be considered, in the user's opinion, in critical conditions. For these particular cases, the present invention allows, for example, to shorten the wait times for accessing specific services or to automatically send short messages to predefined addressees, by correlating the formulae and the parameters with the type of equipment and with the SIM in use, without having to resort to emergency calls.

Another possible variant also takes into account, in the Tbarring calculation, the traffic originated by another user equipment of the network 107 towards the user equipment 105, i.e., the incoming traffic of the user equipment in question. Multiplicative factors can be added to the formulae (2) and (3) to increase the wait time for those user equipments 105 which have been successfully reached by voice calls, SMS messages or data traffic (e.g., instant messaging); the mathematical structure of these factors can be similar to that already described for the traffic of the same type originated by the user equipment 105, and may take into account both the number of communications and the traffic volume in terms of time and/or termination traffic volume.

The invention may therefore be subject to many variations, without however departing from the novelty spirit of the inventive idea. It will be apparent to those skilled in the art that in the practical implementation of the invention the illustrated details may have different shapes or be replaced with other technically equivalent elements. It can therefore be easily understood that the present invention is not limited to the explanatory examples described herein, but may be subject to many modifications, improvements or replacements of equivalent parts and elements without departing from the basic inventive idea, as set out in the following claims.

The invention claimed is:

1. A user equipment comprising
communication means for attempting to access a mobile telecommunications network and to receive from said network information about the presence of access restrictions to the network,
an access management module configured to determine, in the presence of access restrictions to the network, a wait time that must elapse, at the least, between successive verifications of the possibility of accessing said network,
wherein said wait time is determined at least on the basis of the result of at least one previous attempt to access the network by said user equipment.

2. The user equipment according to claim 1, wherein, if said at least one previous attempt to access the network was unsuccessful, then the value of said wait time generated by the module is smaller than that which would have been generated if the same at least one previous attempt to access the network had been successful.

3. The user equipment according to claim 1, wherein, if said at least one previous attempt to access the network was successful, then the value of said wait time generated by the module is greater than that which would have been generated if the same at least one previous attempt to access the network had been unsuccessful.

4. The user equipment according to claim 1, wherein the value of said wait time is generated by the access management module also on the basis of the typology of a service provided by the network for which access is being requested.

5. The user equipment according to claim 1, wherein the value of said wait time is generated by the access management module also on the basis of a traffic volume generated by said user equipment through the network during at least one of the previous attempts to access said network.

6. The user equipment according to claim 1, wherein the value of said wait time is generated by the access management module also on the basis of the result of at least one of the attempts to access the network made before the establishment of the access restrictions to said network.

7. The user equipment according to claim 1, wherein the value of said wait time is generated by the access management module also on the basis of a random or pseudorandom number.

8. The user equipment according to claim 7, wherein the access management module generates the values of the wait time on the basis of a formula comprising at least one factor equal to $Brt \times [1-w1 \times (1-2 \times rand)] \times [1/(1+w2 \times fails^g)]$, where Brt represents a predetermined time interval, w1 is a parameter greater than or equal to 0 and smaller than 1, w2 and g are parameters greater than or equal to 0, rand is a random or pseudorandom numerical value greater than or equal to 0 and smaller than 1, × indicates the multiplication operation, and fails is a non-negative integer value representing the number of unsuccessful attempts to access the network.

9. A method for accessing a mobile telecommunications network, wherein a plurality of user equipments attempt to access said mobile telecommunications network when the latter is subject to access restrictions, said method being executed by at least one of said user equipments when requesting access to said network for the fruition of a service, said method comprising the phases of:
- a) generating a value of a wait time that must elapse before an attempt to access said network can be made, starting from the submission of said access request in the presence of access restrictions,
- b) waiting for a time interval having a duration at least equal to the value generated in phase a),
- c) attempting to access the network for the fruition of said service, wherein the generation of said value of the wait time occurring in phase a) is influenced by at least one result of an attempt to access the network made by said user equipment at a time instant prior to said generation.

10. The method according to claim 9, wherein, if said at least one previous attempt to access the network was unsuccessful, then the value of said generated wait time is smaller than that which would have been generated if the same at least one previous attempt to access the network had been successful.

11. The method according to claim 9, wherein, if said at least one previous attempt to access the network was successful, then the value of said generated wait time is greater than that which would have been generated if the same at least one previous attempt to access the network had been unsuccessful.

12. The method according to claim 9, wherein the value of said wait time is also influenced by the typology of the service provided by the network that the user equipment is about to try to access.

13. The method according to claim 9, wherein the value of said wait time is influenced by a traffic volume generated by the user equipment towards the network during at least one of the previous attempts to access said network.

14. The method according to claim 9, wherein the value of said wait time is generated also on the basis of a random or pseudorandom number.

15. The method according to claim 14, wherein the value of said wait time (Tbarring) is generated on the basis of a formula comprising at least one factor equal to $Brt \times [1-w1 \times (1-2 \times rand)] \times [1/(1+w2 \times fails^g)]$, where Brt represents a predetermined time interval, w1 is a parameter greater than or equal to 0 and smaller than 1, w2 and g are parameters greater than or equal to 0, rand is a random or pseudorandom numerical value greater than or equal to 0 and smaller than 1, × indicates the multiplication operation, and fails is a non-negative integer value representing the number of unsuccessful attempts to access the network.

* * * * *